United States Patent Office 3,073,041
Patented Jan. 15, 1963

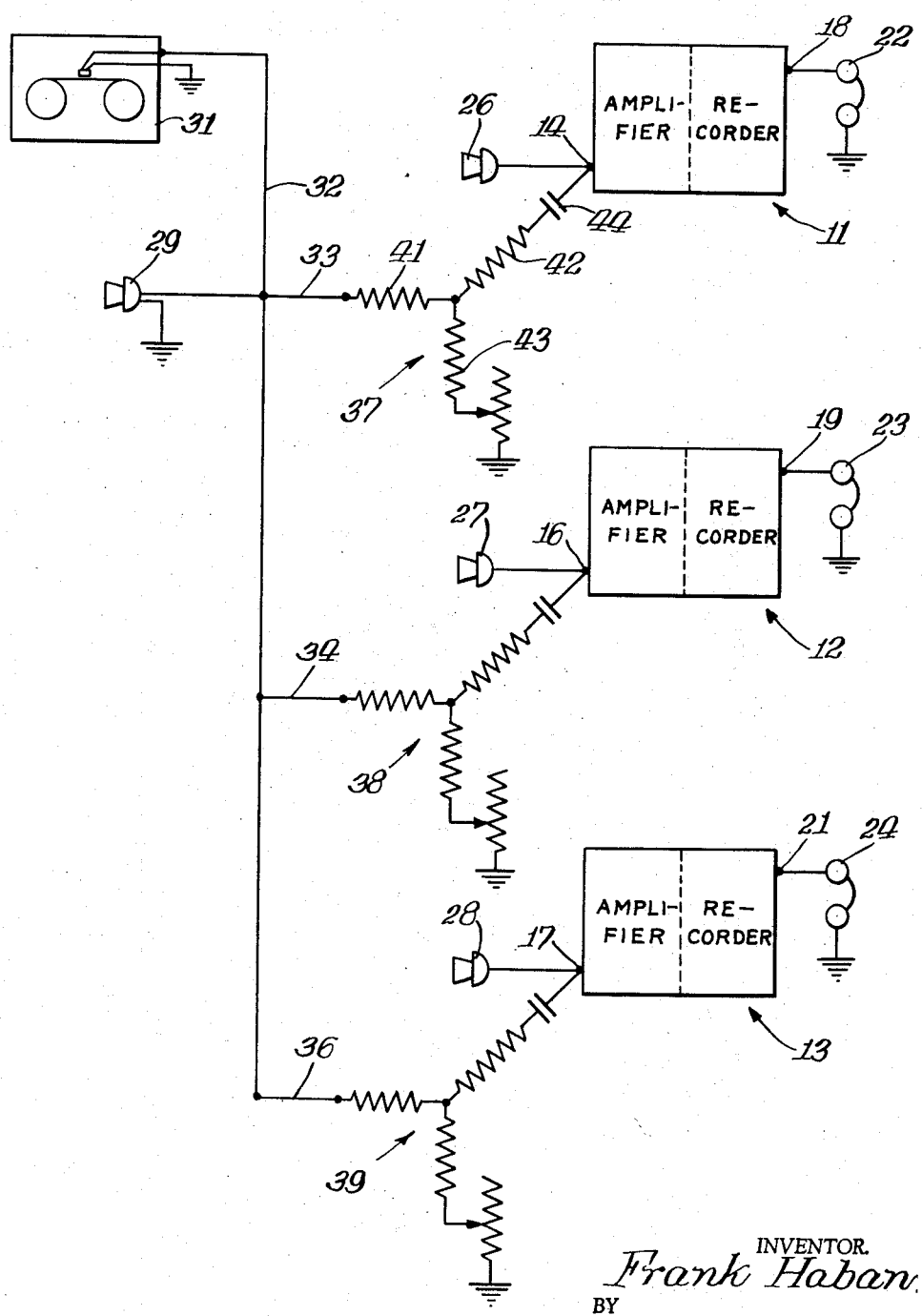

3,073,041
MEANS FOR REDUCING CROSS TALK NOISE
Frank Haban, Manitowoc, Wis., assignor to Hamilton Manufacturing Company, Two Rivers, Wis., a corporation of Wisconsin
Filed Aug. 1, 1961, Ser. No. 128,402
9 Claims. (Cl. 35—35)

The present invention relates to apparatus for reducing cross talk noise between interconnected units in certain forms of communications systems.

Cross talk noise is an unwanted background noise found in various types of communication systems. An example of a system in which cross talk noise has been a problem is the electronic communications systems many schools now use as an aid to teaching foreign languages. It is common practice in these systems to provide for each student a language booth unit having a unit signal source, a microphone and a tape recorder or the like. The tape recorder is used by the student to record his own voice and certain oral material supplied by the instructor. In order that the instructor can supply material to all the units at the same time, the system also includes a master signal source comprising an instructor's microphone and tape recorder or the like. Thus, there are two sources of signals for each unit in such system, a master source common to all units, and a unit source for each unit. Normally, all units in the system are continuously connected to the master source, even when the students are using their unit signal sources. This mode of operation permits the student to alternately record material from the instructor and the student's own voice on the student's recorder for comparison purposes. The connections between all the units and the master signal source provide a way for signals originating in one unit to pass to the other units in the form of cross talk noise. Other communication systems may operate in a similar manner.

It is a primary object of the present invention to provide novel apparatus for substantially eliminating cross talk noise in communications systems such as the above described language teaching systems and the like.

It is a further object to provide such apparatus that is simple and inexpensive and requires no manipulation during operation.

Other objects and advantages of the invention will be apparent from the following description taken in conjunction with the accompanying drawing.

The drawing is a schematic diagram showing a preferred form of the invention in the environment of a language teaching communications system.

The present invention eliminates, as a practical matter, cross talk noise in communications systems, such as language teaching systems, for example, by drastically attenuating or reducing all signals going into and coming out from the units of the system. At the same time, signals from any master signal source are made much stronger than a signal from a unit source to compensate for such reduction. Thus, any signal from the master signal source will be attenuated upon entering the unit to a strength substantially equal to that normally provided by the unit source. Any signal originating within the unit source and leaving the unit in a manner that could cause cross talk noise will be weakened to the point that it will not be picked up by the other units in the system.

The drawing shows, in block form, a familiar language teaching communications system. The system comprises a plurality of identical student booths or units, three being shown in the drawing and indicated generally at 11, 12 and 13. (Of course, a normal system will have many more units.) Each booth or unit is equipped with a record player, such as a conventional tape recorder, and means for amplifying incoming signals. The record player and amplifier are conventional forms and thus are merely shown as blocks in the units 11, 12 and 13. Each of the units 11, 12 and 13 has an input terminal, indicated at 14, 16 and 17, respectively, for receiving input signals. Likewise, each of the units has an output terminal, indicated at 18, 19 and 21, respectively, to which is attached an associated output device for receiving the output, in this instance headphones 22, 23 and 24, respectively. Thus, the amplifiers constitute connecting means between the input and output terminals.

The language student may record his own voice on his recorder and, for this purpose, the units are provided with means including microphones 26, 27 and 28, which are respectively connected to the input terminals 14, 16 and 17.

The system is also arranged to permit the instructor to simultaneously provide identical oral material to each of the units. To this end, the system is provided with a master signal source comprising either a microphone 29 or a tape recorder 31, or both, which are connected to all of the units 11, 12 and 13. As shown in the drawing, the microphone 29 and the tape recorder 31 each has one terminal grounded and another terminal connected to a conductor 32 and through it to leads 33, 34 and 36. The leads 33, 34 and 36 are, in turn, connected through attenuator devices or pads indicated generally at 37, 38 and 39, to be discussed further hereinafter, to the unit input terminals 14, 16 and 17, respectively. Thus, any signal from the microphone 29 or the recorder 31 will be conducted to all units in the system.

The attenuators 37, 38 and 39 prevent any signal, originating in any of the units and feeding back through the associated input terminal, from being effective as cross talk noise. To this end, the attenuators 37, 38 and 39 are preferably of a type that will drastically reduce the strength of any signal passing through in either direction between the associated input terminal and the conductor 32. In the present instance, attenuators 37, 38 and 39 are identical, and, thus, only the attenuator 37, associated with the amplifier 11, will be described.

The attenuator 37 comprises a pair of resistance elements 41 and 42 connected in series between the lead 33 and the terminal 14. The resistance elements 41 and 42 are high resistance elements, having a resistance, in the embodiment shown, of 10,000 ohms. Connected to the junction between the resistance elements 41 and 42 is a variable resistance device 43. The variable resistance device 43 has a relatively low resistance element, in the embodiment shown, being variable from 1500 ohms down to 470 ohms. The terminal of the device 43, opposite its connection to the junction between elements 41 and 42, is grounded, providing a shunt path for reducing signal strength. With this arrangement, the strength of any signal passing between the terminal 14 and the lead 33, in either direction, will be reduced by the ratio of approximately 1,000 to 1. A small capacitor 44 is connected in series between the terminal 14 and the resistor element 42 for blocking any direct current signal components.

To be effective, a signal from the master source must be substantially as strong, when measured at an input terminal, as a signal from the unit sources associated with that input terminal. Hence, in the present embodiment, the microphone 29 and the recorder 31 are adapted to provide signals that are approximately 1000 times stronger, measured at the source, than those provided by the microphones 26, 27 or 28, to compensate for the effect of the attenuators 37, 38 and 39. In the present embodiment of the invention, the average signal voltage measured at the master signal source is 1.5 volts while the signal from the unit microphones 26, 27 or 28 is 1.7 millivolts. The relatively high voltage on the conductor 32 and the leads 33, 34 and 36 is sufficiently high to eliminate any ratio cross talk from the system. When the signal from the master source, either the microphone 29 or the recorder 31, passes through the attenuator 37, it will be reduced to substantially the same strength as the signal from the microphones 26, 27 or 28, that is 1.7 millivolts.

With the arrangement shown, of course, the signal from any of the unit microphones 26, 27 and 28 will be reduced by the ratio of 1,000 to 1 as it passes out of the unit through the associated attenuator. Thus, the signal of 1.7 millivolts will be reduced to a signal of 1.7 microvolts, which is too weak to cause trouble in the present apparatus. Furthermore, any such signal must, to get to one of the other units in the system, pass through a second attenuator which will again reduce signal strength by the ratio of 1,000 to 1.

From the foregoing, it can be readily seen that cross talk noise in systems such as the language teaching systems described is practically eliminated by the present invention. Moreover, the attenuator devices used are simple resistance devices, are inexpensive and, after adjustment, require no manipulation during operation of the system.

I claim:

1. A system comprising a master signal source, a plurality of similar units for receiving electric signals from said master signal source, each of said units comprising a unit signal device, a unit output device, and connecting means having an input terminal connected to the associated unit signal device and an output terminal connected to the associated unit output device, conductor means for connecting said master signal source to each of said input terminals, and means interposed between said conductor means and said input terminals for reducing by a predetermined amount the strength of all signals passing in either direction therebetween, said master signal source providing a signal that is substantially stronger than the signals provided by the unit signal devices.

2. A system according to claim 1, in which said signal reducing means is proportioned to reduce the strength of the signal from said master signal source to substantially that from any of said unit signal devices.

3. A system according to claim 1, in which said signal reducing means comprises an attenuator device for each unit of the system, each attenuator device being connected to the input terminal of its associated connecting means and to said conductor means.

4. A system according to claim 3, in which each attenuator comprises three impedance elements, said elements having inner ends interconnected and outer ends connected respectively to said conductor, an associated input terminal and a signal shunting path.

5. A system according to claim 3, in which each attenuator comprises a pair of equal relatively high resistance elements connected in series between said conductor means and said input terminal, and a third relatively low resistance element having one end connected to the junction between said pair of elements and its opposite end connected to a signal shunting path.

6. A system comprising a master signal source, a plurality of similar units for receiving electric signals from said master signal source, each of said units comprising a unit signal device, a unit output device and connecting means comprising a unit amplifier having an input terminal connected to its associated unit signal device and said master signal source and an output terminal connected to said unit output device, and means for each unit for reducing crosstalk interference due to operation of said unit signal devices, said reducing means comprising attenuator means positioned to attenuate all signals from said master signal source as they enter such unit through said input terminal and to similarly attenuate all signals from its associated unit signal device as such signals leave the unit by said input terminal.

7. A system according to claim 6, in which said master signal source provides a signal substantially stronger than those provided by said unit signal devices, said attenuator being arranged to attenuate all such signals by the ratio substantially of the strength of signal from the master signal source to the strength of signal from any unit signal device.

8. A system according to claim 7, in which said ratio is approximately equal to one thousand to one.

9. A language teaching system, comprising a master instructional signal source, a plurality of student booth units, each comprising a student controlled signal device, a student output listening device, and connecting means, including an amplifier device connected between said student controlled signal device and said listening device, conductor means connecting said instructional signal source to each of said booth units, and attenuating means interposed between said conductor means and said booth units for reducing by a predetermined amount the strength of all signals passing in either direction therebetween, said master instructional signal source providing a signal that is substantially stronger than the signals provided by the student controlled signal devices, whereby each student can listen to material provided by an instructor and by himself without cross talk noise from other booths.

No references cited.